United States Patent [19]

Newstead

[11] 3,842,949

[45] Oct. 22, 1974

[54] DISC BRAKES
[75] Inventor: Charles Newstead, Tyseley, England
[73] Assignee: Girling Limited, Birmingham, England
[22] Filed: Feb. 2, 1973
[21] Appl. No.: 329,019

[30] Foreign Application Priority Data
Feb. 28, 1972 Great Britain...................... 9147/72

[52] U.S. Cl. ............. 188/170, 188/72.3, 188/106 P
[51] Int. Cl. ............................................ F16d 55/18
[58] Field of Search..... 188/71.9, 72.3, 72.6, 106 P, 188/170, 196 D

[56] References Cited
UNITED STATES PATENTS
| | | | |
|---|---|---|---|
| 3,604,865 | 9/1971 | Bricker | 188/1 A X |
| 3,647,030 | 3/1972 | Burnett | 188/72.3 |
| 3,661,230 | 5/1972 | Burnett | 188/71.9 |

Primary Examiner—Duane A. Reger
Attorney, Agent, or Firm—Scrivener Parker Scrivener & Clarke

[57] ABSTRACT

A spring brake actuator for a vehicle wheel disc brake comprises a pad assembly, a strut of adjustable length having a first part fast with a piston of a fluid pressure motor, the piston being spring biassed in a brake-applying direction, and a second part manually adjustable axially relative to the first part between an operative position, in which has thrust transmitting engagement with the pad assembly and holds the first part clear of the assembly, and an inoperative position in which it is released from thrust transmitting engagement with the pad assembly. The first strut part is held clear of the pad assembly either by the application of fluid pressure to the piston or by the engagement of the piston with a mechanical stop under the action of the spring bias.

9 Claims, 3 Drawing Figures

DISC BRAKES

This invention relates to spring brake actuators for vehicle wheel disc brakes.

A known disc brake actuator has a service brake actuator part and a parking or emergency spring brake actuator part, both parts being operative to apply a same brake pad assembly to a brake disc. The spring brake actuator part comprises a brake applying spring, a fluid pressure motor acting against the spring and having a fluid pressure responsive member working in a cylinder, and a strut for transmitting the spring force to the pad assembly, the strut being in thrust-transmitting engagement with the pad assembly and having one part fast with the pressure responsive member. The strut is of adjustable length to compensate for wear on the brake pad, adjustment taking place only when the service brake actuator part is operated.

It is desirable, particularly with commercial vehicles, to provide separate disc brakes for a wheel, one acting as a service brake and the other as a parking or emergency brake. The present invention is particularly concerned with spring brake actuators for such parking brakes.

In accordance with the invention there is provided a spring brake actuator for a vehicle wheel disc brake, comprising a pad assembly, a thrust transmitting assembly acting on the pad assembly in a brake-applying direction, and a fluid pressure motor having a movable pressure responsive member operable to oppose a spring means, wherein the thrust transmitting assembly is constituted by a strut of adjustable length having a first part fast with the pressure responsive member, and a second part manually adjustable in the axial direction, relative to the first part, between an operative position in which it has thrust transmitting engagement with the pad assembly and holds the first part clear of the pad assembly, and an inoperative position in which it is released from thrust transmitting engagement with the pad assembly, the first part being held clear of thrust transmitting engagement with the pad assembly either by the application of fluid pressure to the pressure responsive member of the motor, or by engagement of the pressure responsive member of the motor with mechanical stop means under the action of the spring means.

The first strut part may comprise a tubular sleeve and the second strut part may have an adjuster member extending co-axially within the sleeve and in screw-threaded engagement therewith. Preferably the adjuster member, in its operative position, bears on the pad assembly through the intermediary of a transmission member, preferably of a low-friction material, which is dimensioned and arranged to enter the sleeve member in the inoperative position of the adjuster member.

Two embodiments of a vehicle wheel disc parking or emergency brake including in a spring brake actuator in accordance with the invention, will now be described, by way of example, with reference to the accompanying drawings in which.

Figure 1:
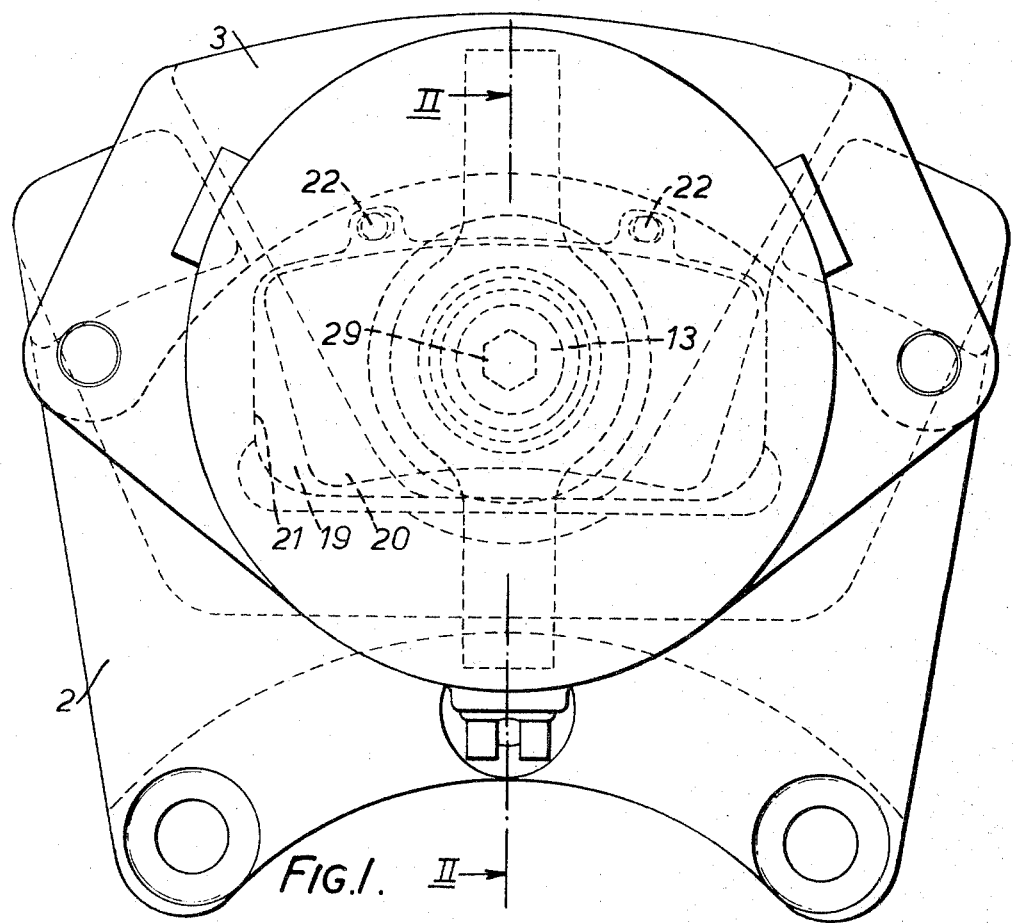
FIG. 1 is an end view of one embodiment.
Figure 2:
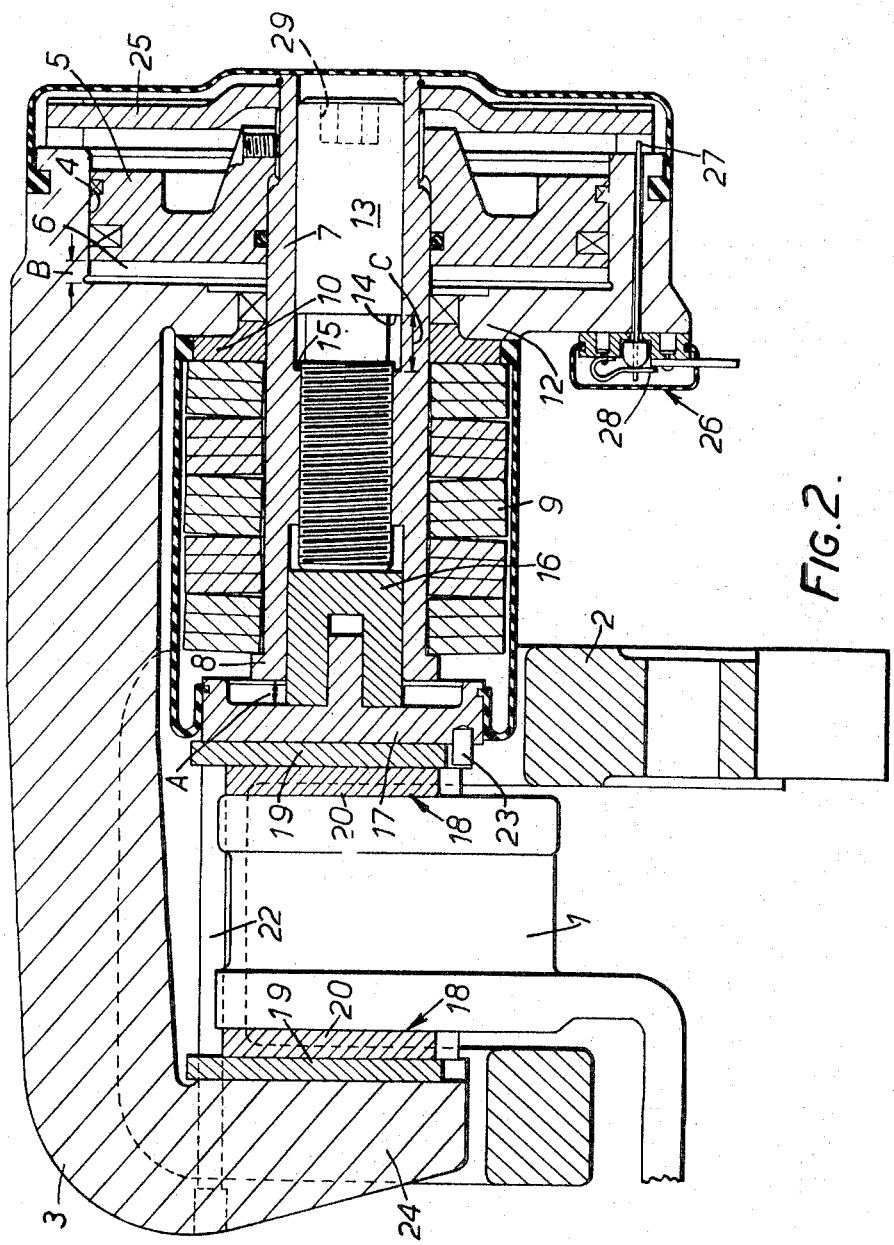
FIG. 2 is a sectional view taken on the line II—II of FIG. 1.

The brake shown in FIGS. 1 and 2 comprises a disc 1 straddled by a fixed torque plate 2 upon which a caliper 3 is slidably mounted. At one end of the caliper 3 is a cylinder 4 within which a piston 5 is slidable in response to fluid pressure changes in a chamber 6 of the cylinder. The chamber 6 has an end wall 6a which acts as a stop for the piston 5 when pressure is relieved from the chamber. The piston 5 is screwed on to a tubular sleeve 7 and secured thereto for example by means of a grub screw, the tubular sleeve 7 having a radially outwardly extending flange 8 at its inner end (i.e. the end nearer the disc 1) which provides an abutment for a stack of Belleville washers 9. An annular member 10 which seats against a flange 12 of the caliper 3 provides the other abutment for the Belleville washers 9.

An adjuster member 13 extends co-axially within the sleeve 7 and is in screw-threaded engagement therewith. Movement of the adjuster member within the sleeve 7 is limited by the contact of shoulders 14 and 15, on the adjuster member 13 and the sleeve 7 respectively. The inner end of the adjuster member abuts a transmission member 16 of low friction material which is arranged to enter the sleeve. Two pad assemblies 18, which comprise a backing plate 19 and a friction pad 20, are located on opposite sides of the disc 1 and are retained by a pair of pins 22 passing through the caliper body, and surfaces 21 machined in the caliper. One of the pad assemblies comprises a pressure plate 17 which is connected to the backing plate by a pin 23 to prevent rotation of the pressure plate 17 when the brake is released, and the other pad assembly is retained in an arm 24 of the caliper 3. The pressure plate 17 has a central spigot which extends within a complementary bore in the transmission member 16 so that the pressure plate is supported by the member 16.

The outer end of the sleeve 7 carries a cover plate 25 which is arranged to move with the sleeve to actuate a wear detector and indicator assembly 26. When sufficient wear of the pads has occurred, during application of the brake the plate 25 contacts a probe 27 as the plate moves to the left. Movement of the probe 27 breaks an electrical contact 28 and actuates a warning device which is conveniently situated in the vehicle cab.

The operation of the brake will now be described. In the brakes-off condition, the chamber 6 is pressurised to bias the piston 5 and thus the sleeve 7 and adjuster member 13 to the right as shown in FIG. 2. The Belleville washers 9 are retained in a compressed state by sleeve 7 and the pad assemblies are not applied to the disc. When the fluid pressure in chamber 6 is released, the Belleville washers 9 move the sleeve 7 and adjuster member 13 to the left so that the adjuster member abuts the low friction transmission member 16 to move the pressure plate 17 to the left to apply the brake. Since the force of the Belleville washers 9 is applied to the pad assemblies through the intermediary of the adjuster member, the brake can be released by unscrewing the adjuster member from the sleeve 7 in the event of a fluid pressure failure to allow the vehicle to be moved. For this purpose, the adjuster member is provided with a slot 29 at its outer end which accepts a key. Further, the brake may be initially adjusted by screwing in the adjuster member 13 until the brake is applied and then unscrewing it by a predetermined amount. The provision of the low friction transmission member 16 enables the adjuster member to be more easily unscrewed against the compressive forces set up between the disc 1 and the Belleville washers 9. It will be seen that the sleeve 7 constitutes a first part and the adjuster member 13 and transmission member 16 constitute a second part of a strut of adjustable length.

To ensure that the brake is not applied by the sleeve 7 acting directly on the pressure plate 17, the distance A between the pressure plate and the flange 8 of the sleeve is greater than the stroke B of piston 5. The sleeve 7 will thus be held clear of the pressure plate 17 either by the application of fluid pressure to the piston 5 or by the engagement of the piston 5 with the end wall 6a of the chamber 6. Thus, the brake cannot be "over-applied" and the risk of injury when removing worn pads is reduced. To prevent the backing plates 19 of the pad assemblies 18 from scoring the disc 1, when the friction pads 20 have worn away, the distance C between the shoulders 14 and 15 of the adjuster member 13 and sleeve 7, respectively, is aproximately equal to twice the maximum thickness of one friction pad less the piston stroke B.

Figure 3:
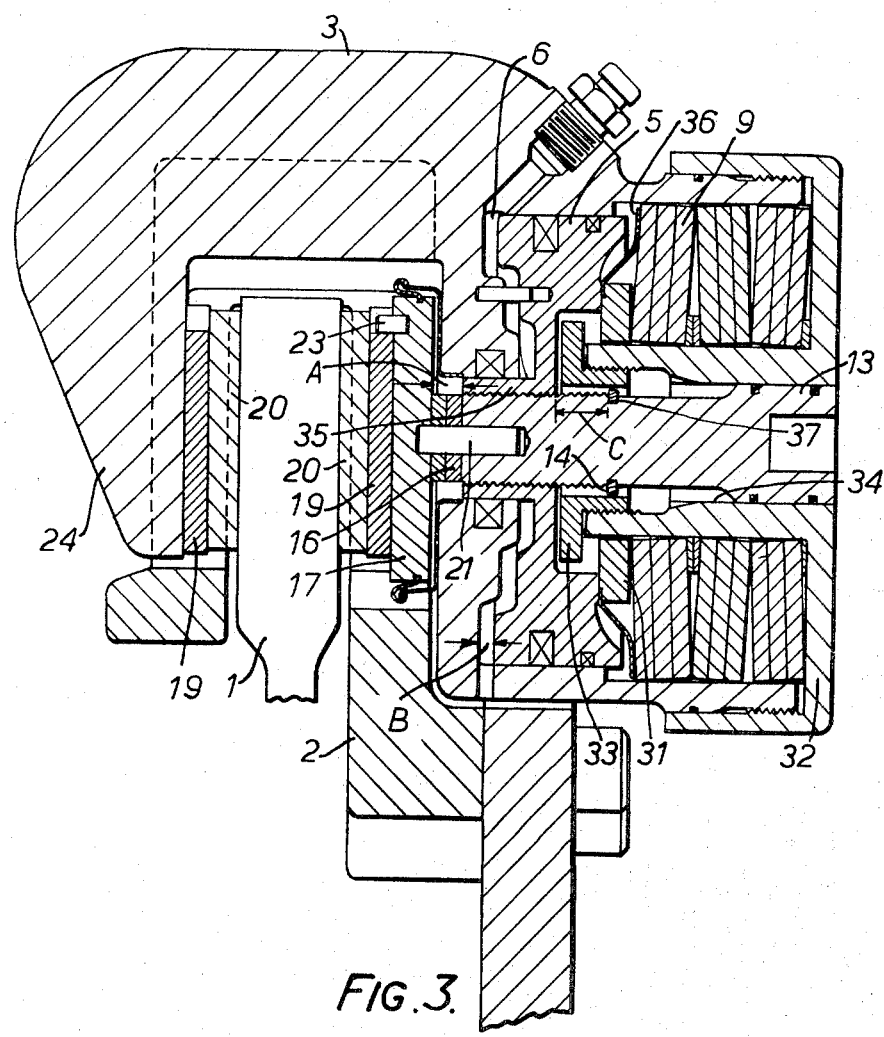
FIG. 3 is a sectional view similar to that of FIG. 2, but of the other embodiment.

Referring to FIG. 3, this embodiment is generally similar to that described above and only the main differences will be described. Corresponding parts have been allotted the same reference numerals. In this embodiment, the Belleville washers 9 are retained by means of a thrust washer 31 in a housing member 32 which is screwed on to the caliper 3. The thrust washer 31 is itself held in position by a flanged annular nut 33 surrounding the adjuster member 13 and screwed into a central bore 34 in the housing member 32. The piston 5 is located inwardly of the Belleville washers 9 so that it engages the thrust washer 31 to compress the Belleville washers when the chamber 6 is pressurised. The adjuster member 13 is in this embodiment screwed into a sleeve 35 formed integrally with the piston 5.

When the pressure is released from the chamber 6, the Belleville washers move the piston 5 and adjuster member 13 to the left. The adjuster member 13 engages the low friction transmission member 16 to move the pressure plate 17 and apply the brake. The transmission member 16 is a flat disc and is supported between the adjuster member 13 and pressure plate 17 by a central pin 21.

In the embodiment, the wear indicator assembly is actuated by an annular plate 36 held between the piston 5 and thrust washer 31. The plate 36 is arranged to engage a pin (not shown) projecting through a slot in the caliper 3. When there is sufficient axial movement of the plate 36 due to friction pad wear, the pin is tilted a sufficient amount about a resilient connection to disengage a pair of contacts and actuate the warning device.

As in the first embodiment, the distance A, in this case between the sleeve 35 of piston 5 and the pressure plate 17, is greater than the piston stroke B. Also, the distance C, between the piston 5 and the shoulder 14 formed by a circlip 37 on the adjuster member 13 is approximately equal to twice the pad thickness minus the piston stroke B.

The second embodiment has the advantage that the axial length of the brake is reduced as compared to the length of the brake of the first embodiment.

I claim:

1. In or for a vehicle wheel disc brake having a rotatable disc, a spring brake actuator which comprises a friction pad assembly for frictionally engaging said disc to apply the brake, a thrust transmitting assembly acting on said pad assembly in a brake-applying direction, and a fluid pressure motor including spring means, a pressure responsive member operable to oppose said spring means and mechanical stop means limiting movement of said pressure responsive member in said brake applying direction, said thrust transmitting assembly comprising a strut of adjustable length having a first part fast with said pressure responsive member, and a second part manually adjustable axially relative to said first part, between an operative position in which said second part has simple abutting engagement with said pad assembly and holds said first part clear of said pad assembly and an inoperative position in which said second part is released from simple abutting engagement with said pad assembly, said first part being held clear of thrust transmitting engagement with said pad assembly either by the application of fluid pressure to said pressure responsive member of said motor, or by engagement of said pressure responsive member of said motor with said mechanical stop means under the action of said spring means.

2. An actuator according to claim 1, wherein said first strut part comprises a tubular sleeve and said second strut part includes an adjuster member extending co-axially within said sleeve and in screw-threaded engagement therewith.

3. An actuator according to claim 2, wherein said second strut part comprises a transmission member disposed between said adjuster member and said pad assembly and dimensioned and arranged to enter said sleeve in said inoperative position of said adjuster member, said adjuster member bearing on said pad assembly through the intermediary of said transmission member in said operative position of said adjuster member.

4. An actuator according to claim 3, wherein said transmission member is formed of low friction material.

5. An actuator according to claim 1, wherein said pad assembly comprises a backing member and a friction pad mounted on the backing member and wherein the permissible movement of said second strut part between said inoperative position, in which it is just released from thrust transmitting engagement with said pad assembly, and position when said strut is of maximum length is approximately equal to twice the maximum thickness of said friction pad less the maximum permissible movement of said pressure responsive member of said motor.

6. An actuator according to claim 5, wherein said first and second strut parts carry stop means and said permissible movement of said second strut part is limited by the interengagement of said stop means.

7. An actuator according to claim 1, including a fixed member, wherein said spring means comprises a stack of Belleville washers acting directly between said fixed member and said first strut part, said Belleville washers surrounding both said first and second strut parts and being disposed between said pressure responsive member and said pad assembly.

8. An actuator according to claim 1, including a fixed member, wherein said spring means comprises a stack of Belleville washers acting between said fixed member and said pressure responsive member and arranged on one side of said pressure responsive member remote from said pad assembly.

9. An actuator according to claim 1, including means for detecting and indicating excessive movement of said first strut part due to wear of said pad assembly.

* * * * *